United States Patent [19]

Brann

[11] Patent Number: 5,409,740

[45] Date of Patent: Apr. 25, 1995

[54] DUAL-CURE METHOD OF FORMING INDUSTRIAL THREADS

[75] Inventor: Bill L. Brann, Erie, Pa.

[73] Assignee: Lord Corporation, Erie, Pa.

[21] Appl. No.: 993,047

[22] Filed: Dec. 18, 1992

[51] Int. Cl.$^6$ .................. B05D 3/06; B32B 27/34; C08F 2/50

[52] U.S. Cl. .................. 427/513; 428/394; 428/395; 522/90; 522/96; 522/97; 522/100; 522/103; 522/104; 522/107; 522/182

[58] Field of Search .............. 522/96, 90, 97, 100, 522/103, 104, 107, 182; 427/513; 428/395, 394

[56] References Cited

U.S. PATENT DOCUMENTS

| | | | |
|---|---|---|---|
| 4,128,600 | 12/1978 | Skinner et al. | 522/182 |
| 4,138,299 | 2/1979 | Bolgiano | 204/159.16 |
| 4,424,252 | 1/1984 | Nativi | 428/209 |
| 4,434,208 | 2/1984 | Girgis | 428/395 |
| 4,479,984 | 10/1984 | Levy et al. | 522/96 |
| 4,663,231 | 5/1987 | Girgis et al. | 428/395 |
| 4,762,750 | 8/1988 | Girgis et al. | 428/395 |
| 5,049,407 | 9/1991 | Soszka et al. | 427/54.1 |

*Primary Examiner*—Susan W. Berman

[57] ABSTRACT

A method of forming a fiber bundle which is useful as an industrial thread. The fiber bundle is prepared by integrating individual fiber filaments into a fiber bundle, applying a dual-cure adhesive material to the fiber bundle and initiating polymerization of the dual-cure adhesive material. The dual-cure adhesive material is a combination of a radiation-curable material and a moisture-curable material. The radiation-curable material contains an acrylourethane oligomer and a reactive diluent system, while the moisture-curable material contains a polyisocyanate or an isocyanate-functional urethane prepolymer. The use of a dual-cure material results in a synergistic curing process so as to form a durable and flexible industrial thread or fiber.

28 Claims, No Drawings

DUAL-CURE METHOD OF FORMING INDUSTRIAL THREADS

FIELD OF THE INVENTION

The present invention relates to the formation of threads or fibers for use in industrial applications. More specifically, the present invention relates to the integration of individual fiber filaments into a fiber bundle useful as an industrial thread or fiber by utilizing a radiation-curable material in combination with a moisture-curable material so as to avoid the use of volatile organic solvents and to create an industrial thread which is capable of withstanding high stresses.

BACKGROUND OF THE INVENTION

Industrial threads or fibers are utilized in numerous industrial applications and in the formation of various consumer products. For example, industrial threads or fibers can be found in outdoor equipment such as tents, backpacks, sails, golf bags, and the like. Other products incorporating industrial threads or fibers include shoes, carpets, rugs, automotive and aircraft upholstery and the like. The durability, weatherability, flexibility and other characteristics of these products depend in large part upon the quality and nature of the industrial thread or fiber incorporated into the product.

Industrial threads or fibers are typically prepared from smaller individual fiber filaments. The individual fiber filaments utilized to prepare the industrial threads can be made of essentially any synthetic or natural material but are typically derived from, for example, various polymers such as nylons, polyesters, acetates, polyacrylonitriles, polyamides or aromatic polyamides such as KEVLAR from Du Pont de Nemours, E. I. & Co., or other materials such as regenerated cellulose. The fiber filaments are wound, woven, or otherwise combined or integrated to form the larger industrial thread or fiber. The individual fiber filaments may also be reinforced with an appropriate adhesive composition that binds the fiber filaments. When utilizing an adhesive composition to bind individual fiber filaments in the formation of an industrial thread or fiber, it is desirable to utilize an adhesive composition that will create adhesion between a significant number of fiber filaments and add to the overall toughness and flexibility of the industrial thread.

It has previously been proposed to utilize low solids solvent-based adhesive compositions for bonding fiber filaments to form industrial threads or fibers. However, the process for preparing such low solids, heat curable, solvent-containing adhesives requires the utilization of particularly volatile and hazardous solvents and is very difficult to carry out in an environmentally acceptable manner. The adhesives themselves also require the use of environmentally undesirable solvents, and a relatively high amount of heat energy is required to drive the solvent from the adhesive after application to the fiber filament bundle.

SUMMARY OF THE INVENTION

The present invention is a dual-cure adhesive method useful for bonding fiber filament bundles that avoids the use of a solvent carrier so as to eliminate environmental concerns and facilitate application procedures. The invention also minimizes volume shrinkage during polymerization and allows the curing process to penetrate the interior of the fiber filament bundle so as to form a durable and flexible industrial thread or fiber. The present method involves integrating a plurality of fiber filaments to form a fiber bundle and applying a radiation-curable material and a moisture-curable material as a dual-cure adhesive to the fiber bundle. The coated fiber bundle is then exposed to radiation so as to cure the radiation-curable material. Surface moisture on the fiber bundle and atmospheric moisture act to initiate cure of the moisture-curable material and allows polymerization to penetrate the interior of the fiber bundle subsequent to exposure to radiation. The radiation-curable material of the present invention comprises an acrylourethane oligomer and a reactive diluent system, while the moisture-curable material comprises an isocyanate-functional compound.

It has presently been discovered that a radiation-curable material and moisture-curable material, when applied in combination to a fiber bundle, provides for synergistic properties which cannot be obtained by utilizing a radiation-curable material or a moisture-curable material alone. It is believed that the utilization of such a combination of curable materials results in a true interpenetrating polymer network which provides for an unusually strong industrial thread that can withstand high stresses such as those experienced during industrial sewing processes.

DETAILED DESCRIPTION OF THE INVENTION

The first step of the present invention involves integrating a plurality (two or more) of fiber filaments so as to form a fiber bundle suitable for bonding. The fiber filaments useful in the present invention can essentially be any fiber made of any type of material capable of being wound or woven into larger threads. The fiber filaments are preferably formed of polymeric materials such as nylons, polyesters, acetates, polyacrylonitriles, polyamides or aromatic polyamides such as KEVLAR from Du Pont de Nemours, E. I. & Co., or other materials such as regenerated cellulose, and typically have a diameter ranging from about 0.5 to 2.0, preferably from about 0.7 to 1.5 mils. Polymeric fiber filaments which have been found to be particularly useful in the adhesive system of the present invention include nylon and polyester fiber filaments.

In order to form a fiber bundle suitable for bonding in accordance with the present invention, the fiber filaments may be integrated by winding, weaving, spin-extruding, laying or otherwise arranging the filaments adjacent to one another in the form of a fiber bundle which is useful as a rope or thread. Techniques for forming fiber bundles are well known in the art. The fiber filaments are preferably wound to form a fiber bundle having a diameter between about 2 and 40, preferably between about 5 and 20 mils.

The second step of the present invention involves applying the combination of a radiation-curable material and a moisture-curable material as a dual-cure adhesive to the fiber bundle. The radiation-curable material of the present invention preferably comprises an acrylate oligomer in combination with a reactive diluent system. The acrylate oligomer can be selected from the group consisting of acrylourethane oligomers, polyester acrylate oligomers, polyether acrylate oligomers and mixtures thereof. The acrylourethane oligomer can be any of the conventional acrylourethanes prepared by reacting an olefinically unsaturated compound with an isocyanate-functional urethane formed by the reaction of an excess of a polyisocyanate with a polyol selected from the group consisting of polyether, polyester, polycaprolactone and polyetherester polyols.

The olefinically unsaturated compounds employed for the preparation of the present acrylourethane oligomers may be monomeric or polymeric and are characterized by the presence of a single isocyanate-reactive moiety such as an active hydrogen group. Preferably, the active hydrogen group is hydroxy. Illustrative of unsaturated addition-polymerizable monomeric organic compounds having a single isocyanate-reactive active hydrogen group are 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, reaction products of polyether glycols of acrylic or methacrylic acid and the like.

The preferred olefinically unsaturated compounds are lactone-modified acrylate or methacrylate acid esters (hereinafter "lactone-acrylate adducts") prepared by reacting an appropriate lactone with an acrylate or methacrylate acid ester.

Lactones employed in the preparation of the lactone-acrylate adducts typically have the formula

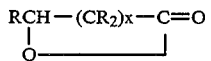

wherein R is hydrogen or an alkyl group having from 1 to 12 carbon atoms, x is from 4 to 7 and at least (x−2) R's are hydrogen. Preferred lactones are the epsilon-caprolactones wherein x is 4 and at least 6 of the R's are hydrogen with the remainder, if any, being alkyl groups. Preferably, none of the substituents contain more than 12 carbon atoms and the total number of carbon atoms in these substituents on the lactone ting does not exceed 12. Unsubstituted epsilon-caprolactone, i.e., where all the R's are hydrogen, is a derivative of 6-hydroxyhexanoic acid. Both the unsubstituted and substituted epsilon-caprolactones are available by reacting the corresponding cyclohexanone with an oxidizing agent such as peracetic acid.

Substituted epsilon-caprolactones found to be most suitable for preparing the present lactone-acrylate adducts are the various epsilon-monoalkylcaprolactones wherein the alkyl groups contain from 1 to 12 carbon atoms, e.g., epsilon-methylcaprolactone, epsilon-ethylcaprolactone, epsilon-propylcaprolactone and epsilon-dodecylcaprolactone. Useful also are the epsilon-dialkylcaprolactones in which the two alkyl groups are substituted on the same or different carbon atoms, but not both on the omega carbon atoms. Also useful are the epsilon-trialkylcaprolactones wherein 2 or 3 carbon atoms in the lactone ring are substituted provided, though, that the omega carbon atom is not disubstituted. The most preferred lactone starting reactant is the epsilon-caprolactone wherein x in the formula is 4 and all the R's are hydrogen.

The acrylate or methacrylate acid esters utilized to prepare the lactone-acrylate adducts contain from 1 to 3 acrylyl or alpha-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains from 2 to 10 carbon atoms, preferably from 2 to 6 carbon atoms. The hydroxyalkyl acrylates and methacrylates have the following formula:

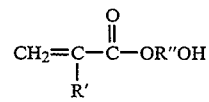

wherein R' is hydrogen or methyl and R'' is a linear or a branched alkylene group having from 2 to 10 carbon atoms, preferably from 2 to 6 carbon atoms.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

A molar ratio of the lactone to hydroxyl groups in the ester of from about 1:0.1 to about 1:5, preferably from about 1:0.3 to about 1:3 is typically utilized. Generally, a temperature of from about 25° C. to about 150° C., preferably from about 25° C. to about 100° C., is used. Times of reaction vary depending upon the temperature and catalyst used; however, generally, the reaction is allowed to proceed from about 20 minutes to about 10 hours, preferably from about 20 minutes to about 5 hours. Suitable catalysts include sulfuric acid, para-toluene sulfonic acid, stannous octoate and butyl titanate.

An example of a lactone-acrylate adduct preferred for use in the present invention is a caprolactone-2-hydroxyethyl acrylate adduct supplied by Union Carbide Corporation under the tradename TONE M-100.

The isocyanate-functional urethanes for preparing the present acrylourethane oligomers are formed by the reaction of an excess of a polyisocyanate with a polyol. The polyisocyanate compounds which are employed in forming the acrylourethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, toluene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4''-triisocyanate, polymethylene polyphenylisocyanate, m-phenylene diisocyanate, p-phenylene diisocyanate, 2,6-toluene diisocyanate, 1,5-naphthalene diisocyanate, naphthalene-1,4-diisocyanate, diphenylene-4,4'-diisocyanate, 1,4-cyclohexylene dimethylene diisocyanate, xylene-1,4-diisocyanate, xylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, m-tetramethyl xylene diisocyanate, the product obtained by reacting trimethylol propane and 2,4-toluene diisocyanate in a ratio of 1:3, and the like. The diisocyanate compounds are preferred, with isophorone diisocyanate being especially preferred.

The polyol to be reacted with the polyisocyanate can essentially be any polyether, polyester, polycaprolactone or polyetherester polyol or mixture thereof known in the art.

The polyether polyols are well known articles of commerce and are also commonly referred to as poly(alkylene oxide)polyols or poyalkylene ether glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide)polyols have from 1 to 9, preferably 1 to 6, carbon atoms in the alkylene chain separating each pair of oxygen atoms and have a number average molecular weight in the range from about 100 to about 4000, preferably about 300 to about 3000. Representative poly(alkylene oxide)polyols include poly(ethylene oxide)polyols, poly(propylene oxide)polyols, poly(tetramethylene oxide)polyols, poly(nonamethylene oxide)polyols, poly(oxy-methylene-ethylene oxide)polyols, poly(ethylene oxide-propylene oxide copolymer)polyols, and poly(pentaerythritolethylene oxide)polyols. Thus the poly(alkylene oxide)polyols will generally have from 2 to 6 hydroxyl groups, with such polyols having 2 hydroxyl groups being currently preferred. Preferred poly(alkylene oxide)polyols are poly(tetramethylene oxide)polyols, poly(propylene oxide)polyols, poly(ethylene oxideopropylene oxide)polyols, and poly(ethylene oxide)polyols, with poly(ethylene oxide)polyols being especially preferred.

The polyester polyols are condensation polymers of an excess of a polyol such as a diol, triol or the like and an aliphatic, cycloaliphatic or aromatic carboxylic acid having at least two carboxyl groups and including anhydrides of such acids. Polycarboxylic acids which may be employed in forming the polyester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyester include an aliphatic dicarboxylic acid as at least part of the acid component. Polyols utilized to prepare the present polyester polyols include ethylene glycol, diethylene glycol, 1,4-butane diol, 1,3-propane diol, 1,6-hexane diol, trimethylol propane, glycerol, erythritol, pentaerythritol, poly(ethylene oxide) diol, poly(ethylene oxide/propylene oxide) diol and poly(tetra-methylene oxide) diol in various combinations well known in the art. Examples of suitable polyester polyols for use in the invention include poly(tetramethylene adipate)diol; poly(ethylene succinate)diol; poly(1,3-butylene sebacate)diol; poly(hexylene phthalate)diol; 1,3-butylene glycol/glycerine/adipic acid/isophthalic acid) diols and triols and the like. The polyester polyol preferably has a number average molecular weight between about 300 and 2000, most preferably between about 400 and 1000. Polyester polyols are, in general, preferred over the other polyols disclosed herein for preparing the acrylate oligomer.

The polycaprolactone polyols of the present invention are well known and are typically esterification polymers of polycaprolactone diols and triols with polycarboxylic acids such as those discussed above.

The polyetherester polyols of the invention may be prepared by conventional esterification techniques employing conventional apparatus. Esterification is generally effected in the presence of an inert atmosphere such as nitrogen. The polyether polyol and non-polyether polyol monomeric and polymeric materials are mixed in a suitable reactor and heated with agitation to a temperature from 60° C. to 100° C. or higher. The acid components are then added and heating with agitation is continued at a temperature and rate such that the water of esterification can be rapidly removed, generally by distillation. The esterification reaction is continued until the acid number is 10 or less and substantially all of the water of esterification and low-boiling impurities are removed. Polyetherester polyols and their preparation are also disclosed in detail in, for example, U.S. Pat. Nos. 4,188,455; 4,358,476; and 4,391,686, all of which are incorporated herein by reference. It is preferred that the polycaprolactone polyols and the polyetherester polyols have a number average molecular weight between about 300 and 3000.

The acrylourethane oligomers can be prepared by any of several known reaction routes, including, (1) simultaneous reactions of polyisocyanate, polyol and olefinically unsaturated compound; and (2) reaction of polyisocyanate and olefinically unsaturated compound to form an unsaturated isocyanate-functional compound which is then reacted with the polyol, the amount of unsaturated isocyanate being sufficient to consume all hydroxyl groups of the polyol, with any excess isocyanate moieties being preferentially reacted with additional olefinically unsaturated compound. The preferred method of forming the oligomers is a two-step method comprising (i) reacting the polyol with excess polyisocyanate to form an isoycanate-functional urethane prepolymer and (ii) reacting the thus-formed urethane prepolymer with sufficient olefinically unsaturated compound to form an acrylated polyurethane which has substantially no free reactive isocyanate functionality. In forming the acrylourethane oligomers of this invention, there will be employed at least a slight excess of polyisocyanate with respect to the hydroxyl functionality of the polyol. Preferably, the amount of polyisocyanate will be sufficient to provide an NCO:OH ratio, with respect to the polyol, in the range of about 1.5:1 to 3.5:1, preferably in the range from about 2.0:1 to 2.5:1. The oligomers of this invention can be prepared neat, as can the intermediates in the multi-step processes, but are preferably prepared in the presence of a diluent system which is copolymerizable with the acrylated urethane oligomer but is otherwise inert during the particular process of preparing the oligomers. The various methods of preparing unsaturated urethane resins are well known and are described in, for example, U.S. Pat. No. 3,700,643, which is incorporated herein by reference.

The polyester or polyether acrylate oligomers useful as the acrylate oligomer of the present invention are well known and are described in, for example, U.S. Pat.

Nos. 4,416,974 and 4,900,763, which are incorporated herein by reference.

The acrylate oligomer of the present invention typically comprises from about 20 to 60, preferably from about 30 to 50, percent by weight of the radiation-curable material.

As mentioned above, a reactive diluent system is employed in combination with the acrylate oligomer in the radiation-curable material of this invention. Broadly, suitable reactive diluent systems comprise at least one unsaturated addition-polymerizable monomer which is copolymerizable with the acrylate oligomer upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Such combinations of mono and polyfunctional reactive diluents are presently preferred. Particularly preferred reactive diluents are unsaturated addition-polymerizable monofunctional and polyfunctional acrylic monomers. Monofunctional acrylic monomers useful as a reactive diluent system are well known and examples of such monomers include isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxy-ethoxy)ethyl acrylate, n-lauryl acrylate, 2-phenoxyethyl acrylate, glycidyl acrylate, glycidyl methacrylate, acrylated methylolmelamine, and 2-(N,N-diethylamino)-ethyl acrylate. Examples of polyfunctional acrylic monomers include neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from 2 to 14 moles of either ethylene or propylene oxide, triethylene glycol diacrylate, tetraethylene glycol diacrylate, polyethylene glycol diacrylate, 1,3-butylene glycol diacrylate, 1,4-butanediol diacrylate, 1,6-hexanediol diacrylate, polyethylene glycol diacrylate, any corresponding methacrylates thereof, and combinations thereof. Preferred reactive diluents for purposes of the present invention include isodecyl acrylate and 1,6-hexanediol diacrylate. The reactive diluent system typically comprises from about 10 to 65, preferably from about 25 to 50, percent by weight of the radiation-curable material.

The radiation-curable material may optionally contain one or more photoinitiators to catalyze or accelerate cure by exposure to ultraviolet radiation. The photoinitiator can be any of the known photoinitiators such as benzophenone, benzoin, acetophenone, benzoin methyl ether, Michler's ketone, benzoin butyl ether, xanthone, thioxanthone, propiophenone, fluorenone, carbozole, diethyoxyacetophenone, the 2-, 3- and 4-methylacetophenones and methoxy-acetophenones, the 2- and 3- chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allyl-acetophenone, p-diacetylbenzene, 3-chloro-2-nonylxanthone, 2o-chlorobenzophenone, 4-methoxybenzophenone, 2,2',4,4'-tetrachlorobenzo-phenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-isopropyl-thiozanthone, 2-methylthioxanthone, 2-decylthioxanthone, 2-dodecyl-thioxanthone, 2-methyl- 1-[4-(methyl thio)phenyl)]-2-morpholino-propanone-1, combinations thereof and the like. The photoinitiator or combination of photoinitiators is typically utilized in an amount ranging from about 1 to 15, preferably from about 5 to 10, percent by weight of the radiation-curable material. If the radiation-curable material is cured by exposure to electron beam radiation, a photoinitiator is typically not utilized.

The moisture-curable material of the present invention comprises an isocyanate-functional compound. The isocyanate-functional compound can either be a polyisocyanate or an isocyanate-functional urethane prepolymer. The polyisocyanate compound useful as the moisture-curable material of the present invention can be any of the polyisocyanates described above with respect to the preparation of the acrylourethane oligomer and is preferably a polyfunctional aliphatic isocyanate based on hexamethylene-1,6-diisocyanate. The isocyanate-functional urethane prepolymer useful as the moisture-curable material of the present invention is typically prepared by the reaction of an excess of a polyisocyanate with a polyol. The polyisocyanate compound utilized in forming the isocyanate-functional urethane prepolymers can be any of the polyisocyanate compounds described above and is preferably isophorone diisocyanate. The polyol utilized in forming the isocyanate-functional urethane prepolymer can be any of the polyols described above with respect to the preparation of the acrylourethane oligomer and is preferably a polyester polyol.

The isocyanate-functional urethane prepolymers can be prepared by utilizing at least a slight excess of polyisocyanate with respect to the hydroxyl functionality of the polyol. Preferably, the amount of polyisocyanate will be sufficient to provide an NCO:OH ratio, with respect to the polyol, in the range of about 1.5:1 to 3.5:1, preferably in the range from about 2.0:1 to 2.5:1.

A catalyst for accelerating moisture cure may be optionally utilized with the moisture-curable material of the invention. Moisture-cure urethane catalysts are well-known and examples thereof include stannous octoate, dibutyl tin laurate, dibutyl tin dilauryl mercaptide, zinc octoate, zirconium octoate and stannous stearate, with stannous octoate being preferred. If employed, the catalyst is typically utilized in an amount ranging from about 0.05 to 5, preferably from about 0.5 to 2, percent by weight of the moisture-curable material.

The dual-cure adhesive of the invention may be prepared by combining the radiation-curable material and the moisture-curable material by hand mixing, mechanical mixing, or the like. The ratio of radiation-curable material to moisture-curable material can range from about 9:1 to 1:1, and preferably ranges from about 4:1 to 1.5:1.

The dual-cure adhesive material of the invention is typically a liquid at room temperature and may be applied to the fiber bundle such as by spraying, dipping, or passing the fiber bundle through a Kiss roll applicator as is known in the art. Other methods for coating fibers or threads with adhesive compositions or coatings known in the art may also be utilized in the present invention. The dual-cure adhesive material is typically applied to the fiber filament bundle in an amount sufficient to add from about 7 to 25, preferably about 10 to 20, percent additional weight to the original weight of the bundle.

The third step of the present invention involves initiating polymerization of the dual-cure adhesive material. The polymerization of the moisture-curable material is initiated by moisture inherently present on the surface of the fiber bundle, in the interior of the fiber bundle, and in the atmosphere. Polymerization or cure of the moisture-curable material thus occurs upon application of the moisture-curable material to the fiber bundle in the presence of moisture. The polymerization of the moisture-curable material then continues for a period of time which is dependent upon the amount of moisture and catalyst present. The polymerization of the radiation-curable material may be initiated by exposing the coated fiber bundle to any source of actinic radiation at a wavelength within the ultraviolet or visible spectral regions so long as that wavelength overlaps the absorption spectrum of any photoinitiator being utilized. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source. The radiationcurable material is preferably polymerized by exposure to electron beam irradiation in a dosage typically ranging from less than about 1 megarad to 100 megarad or more, preferably ranging from about 2 to 10 megarad. Generally speaking, the rate of polymerization increases with increasing amounts of photoinitiator at a given light exposure or electron beam irradiation and also increases with increasing light intensity or electron dosage at a given level of photoinitiator. The use of thermal energy during or after exposure to a radiation source will also generally accelerate the curing reaction, and even a moderate increase in temperature may greatly accelerate cure rate. In any event, the overall energy required to effectuate cure of the polymerizable material of the present invention is significantly less than the amount of energy required to fully cure conventional solventbased adhesive compositions applied to fiber bundles.

The following examples are provided for the purpose of illustration only and are not intended to limit, in any manner, the scope of the present invention which is defined by the claims.

EXAMPLE 1

An acrylourethane oligomer is prepared by reacting 974 g of isophorone diisocyanate with 1032 g of a polyester polyol (K-FLEX 188—King Industries) in the presence of 600 g of isodecyl acrylate as a diluent system. The resulting prepolymer is then reacted with 1394 g of a lactone-acrylate adduct (TONE M-100—Union Carbide Corporation) to form an acrylourethane oligomer. To 35 g of this acrylourethane oligomer is then added 30 g of isodecyl acrylate and 35 g of 1,6-hexanediol diacrylate as additional acrylate monomers for the diluent system. This mixture comprises the raditioncurable portion of the dual-cure material.

A polyfunctional aliphatic isocyanate based on hexamethylene-1,6-diisocyanate (DESMODUR N 3300—Miles Corporation) is utilized as the moisture-curable portion of the dual-cure material.

A dual-cure material is prepared by combining 70 g of the radiation-curable material prepared above with 30 g of the moisture-curable material prepared above.

The resulting adhesive composition is then applied to an industrial thread (10 mils in diameter) comprised of wound nylon fiber filaments. The adhesive is applied by a Kiss roll applicator in an amount that adds approximately 15 percent by weight to the original weight of the thread. The coated thread is then passed under a UV radiation source (Aetek International Inc.) at a speed of 200 feet per minute with one 300 watt per inch medium pressure mercury lamp, at an output spectra in the 200–400 nm wavelength range. The coated 'thread is then allowed to complete the moisture cure in the presence of atmospheric moisture for approximately 96 hours.

The bonded thread prepared above is then stitched into a section of an athletic shoe by an industrial lock stitch sewing machine (Dürkopp America Inc.). The thread effectively withstands a sewing speed of up to 5000 cycles per minute at a tension setting of 30.

What is claimed is:

1. A method of forming a fiber bundle comprising the steps of:
   a) integrating a plurality of polymeric fiber filaments to form a fiber bundle;
   b) forming a mixture of a radiation-curable material and a moisture-curable material as a dual-cure adhesive and applying said mixture to the fiber bundle to form a coated fiber bundle; and
   c) initiating polymerization of the radiation-curable material by exposing the coated fiber bundle to a source of actinic radiation at a wavelength within the ultraviolet or visible spectral regions, and initiating polymerization of the moisture-curable material by moisture inherently present.

2. A method according to claim 1 wherein the fiber filaments are formed of a polymeric material selected from the group consisting of polyesters, acetates, polyacrylonitriles, and polyamides.

3. A method according to claim 1 wherein the fiber filaments are integrated by winding, weaving, spin extruding, or laying.

4. A method according to claim 1 wherein the radiation-curable material comprises an acrylate oligomer in combination with a reactive diluent system.

5. A method according to claim 4 wherein the acrylate oligomer is selected from the group consisting of acrylourethane oligomers, polyester acrylate oligomers, polyether acrylate oligomers and mixtures thereof.

6. A method according to claim 5 wherein the acrylourethane oligomer is prepared by reacting an olefinically unsaturated compound with an isocyanate-functional urethane formed by the reaction of an excess of a polyisocyanate with a polyol.

7. A method according to claim 6 wherein the olefinically unsaturated compound is selected from the group consisting of 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate and reaction products of polyether glycols of acrylic or methacrylic acid.

8. A method according to claim 6 wherein the olefinically unsaturated compound is a lactone-acrylate adduct prepared by reacting an appropriate lactone with an acrylate or methacrylate acid ester.

9. A method according to claim 8 wherein the lactone acrylate adduct is a caprolactone-2-hydroxyethyl acrylate adduct.

10. A method according to claim 6 wherein the polyisocyanate is selected from the group consisting of alkyl, alkylene, cycloaklyl, cycloalkylene, aryl, and arylene polyisocyanates and combinations thereof.

11. A method according to claim 10 wherein the polyisocyanate is selected from the group consisting of toluene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4"-triisocyanate, polymethylene polyphenylisocyanate, m-phenylene diisocyanate, p-phenylene diisocyanate, 2,6-toluene diisocyanate, 1,5-naphthalene diisocyanate, naphthalene- 1,4-diisocyanate, diphenylene-4,4'-diisocyanate, 1,4-cyclohexylene dimethylene diisocyanate, xylene-1,4-diisocyanate, xylene- 1,3-diisocyanate, cyclohexyl- 1,4-diisocyanate, 4,4'-methylenebis(cyclohexyl isocyanate), 3,3'-dimethyldiphenylmethane-4,4'-diisocyanate, isophorone diisocyanate, m-tetramethyl xylene diisocyanate and the product obtained by reacting trimethylol propane and 2,4-toluene diisocyanate in a ratio of 1:3.

12. A method according to claim 11 wherein the polyisocyanate is isophorone diisocyanate.

13. A method according to claim 6 wherein the polyol is a polyether, polyester, polycaprolactone, polyetherester polyol, or combination thereof.

14. A method according to claim 13 wherein the polyol is a polyester polyol prepared by the condensation of an excess of a polyol such as a diol, triol, or the like and an aliphatic, cycloaliphatic, or aromatic carboxylic acid or anhydride thereof having at least two carboxyl groups.

15. A method according to claim 4 wherein the reactive diluent system is selected from the group consisting of unsaturated addition-polymerizable monofunctional and polyfunctional acrylic monomers.

16. A method according to claim 15 wherein the monofunctional acrylic monomer is selected from the group consisting of isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxy-ethoxy)ethyl acrylate, n-lauryl acrylate, 2-phenoxyethyl acrylate, glycidyl methacrylate, glycidyl acrylate, acrylated methylolmelamine, and 2-(N,N-diethylamino)-ethyl acrylate; and wherein the polyfunctional acrylic monomer is selected from the group consisting of neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from 2 to 14 moles of either ethylene or propylene oxide, triethylene glycol diacrylate, tetraethylene glycol diacrylate, polyethylene glycol diacrylate, 1,3-butylene glycol diacrylate, 1,4-butanediol diacrylate, 1,6-hexanediol diacrylate, polyethylene glycol diacrylate, any corresponding methacrylates thereof, and combinations thereof.

17. A method according to claim 16 wherein the monofunctional acrylic monomer is isodecyl acrylate and the polyfunctional acrylic monomer is 1,6-hexanediol diacrylate.

18. A method according to claim 4 further comprising a photoinitiator.

19. A method according to claim 1 wherein the moisture-curable material comprises an isocyanate-functional compound.

20. A method according to claim 19 wherein the isocyanate-functional compound is a polyisocyanate or an isocyanate-functional urethane prepolymer.

21. A method according to claim 20 wherein the polyisocyanate is selected from the group consisting of alkyl, alkylene, cycloaklyl, cycloalkylene, aryl, and arylene polyisocyanates and combinations thereof.

22. A method according to claim 21 wherein the polyisocyanate is selected from the group consisting of toluene-2,4-diisocyanate, 2,2,4-trimethylhexamethylene-1,6-diisocyanate, hexamethylene- 1,6-diisocyanate, diphenylmethane-4,4'-diisocyanate, triphenylmethane-4,4',4"-triisocyanate, polymethylene polyphenylisocyanate, m-phenylene diisocyanate, p-phenylene diisocyanate, 2,6-toluene diisocyanate, 1,5-naphthalene diisocyanate, naphthalene- 1,4-diisocyanate, diphenylene-4,4'-diisocyanate, 1,4-cyclohexylene dimethylene diisocyanate, xylene-1,4-diisocyanate, xylene-1,3-diisocyanate, cyclohexyl-1,4-diisocyanate, 4,4'-methylenebis(cyclohexyl isocyanate), 3,3'-dimethyldiphenylmethane-4,4'-diisocyanate, isophorone diisocyanate, m-tetramethyl xylene diisocyanate and the product obtained by reacting trimethylol propane and 2,4-toluene diisocyanate in a ratio of 1:3.

23. A method according to claim 19 wherein the isocyanate-functional compound is a polyfunctional aliphatic isocyanate based on hexamethylene-1,6-diisocyanate.

24. A method according to claim 20 wherein the isocyanate-functional urethane prepolymer is prepared by the reaction of an excess of a polyisocyanate with a polyol.

25. A method according to claim 24 wherein the polyisocyanate is selected from the group consisting of alkyl, alkylene, cycloaklyl, cycloalkylene, aryl, and arylene polyisocyanates and combinations thereof.

26. A method according to claim 24 wherein the polyol is selected from the group consisting of polyether, polyester, polycaprolactone, polyetherester polyols, and combination thereof.

27. A method according to claim 1 wherein the ratio of radiation-curable material to moisture-curable material ranges from about 9:1 to 1:1.

28. A method according to claim 27 wherein the ratio of radiation-curable material to moisture-curable material ranges from about 4:1 to 1.5:1.

* * * * *